United States Patent

Koyanagi et al.

[11] Patent Number: 6,078,474
[45] Date of Patent: Jun. 20, 2000

[54] RAMP FOR USE WITH A DATA STORAGE DEVICE AND A DATA STORAGE DEVICE

[75] Inventors: Ichiroh Koyanagi, Yokohama; Yuji Kobayashi, Fujisawa; Fuminori Sai, Yokohama, all of Japan; Thomas R. Albrecht, San Jose, Calif.

[73] Assignee: International Business Machines Corporation, Armonk, N.Y.

[21] Appl. No.: 09/069,882

[22] Filed: Apr. 29, 1998

[30] Foreign Application Priority Data

May 7, 1997 [JP] Japan ................................. 9-116659

[51] Int. Cl.[7] ........................................................ G11B 5/54
[52] U.S. Cl. ............................................................ 360/105
[58] Field of Search ...................................... 360/105, 106

[56] References Cited

U.S. PATENT DOCUMENTS

| | | | |
|---|---|---|---|
| 5,289,325 | 2/1994 | Morehouse et al. | 360/105 |
| 5,455,723 | 10/1995 | Boutaghou et al. | 360/105 X |
| 5,757,587 | 5/1998 | Berg et al. | 360/105 |
| 5,828,522 | 10/1998 | Brown et al. | 360/105 |
| 5,831,795 | 11/1998 | Ma et al. | 360/105 |

*Primary Examiner*—William R. Korzuch
*Attorney, Agent, or Firm*—Robert B. Martin

[57] ABSTRACT

The present invention provides an integrally formed ramp that is used for evacuating the suspension arm of a data storage device. The ramp has sliding portions, each having guiding zones and a landing zone. The boundary between the guiding zones and the landing zone is formed parallel to a reference line, so even if the landing portion had a recessed shape, the sliding portion could be molded with a casting mold by pulling out the casting mold in the direction of the reference line. The necessary portion of a support portion which is formed with the same casting mold as the sliding portions is formed so as not to disturb the pulling-out of the casting mold in the direction of the reference line. The integrally molded ramp is high in fabrication accuracy and excellent in defining an accurate loading/unloading position of the suspension arm.

4 Claims, 8 Drawing Sheets

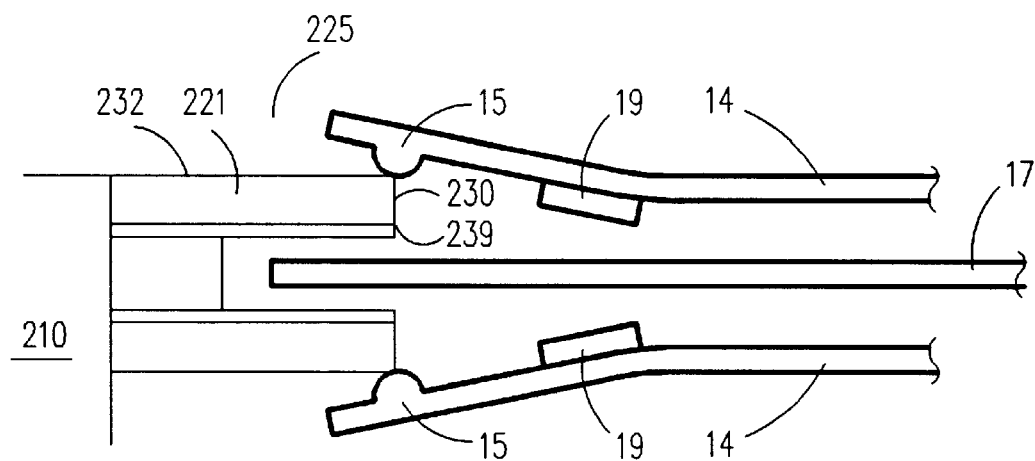
FIG. 9
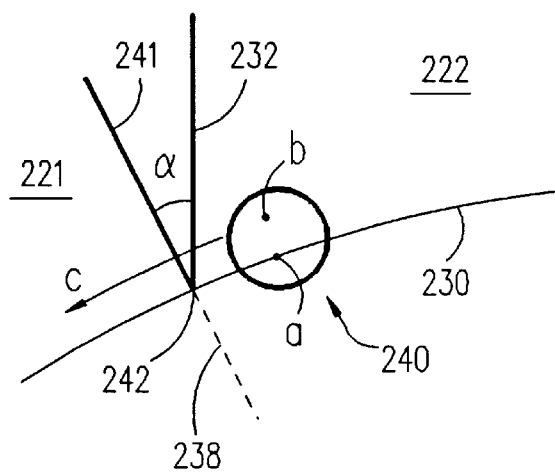 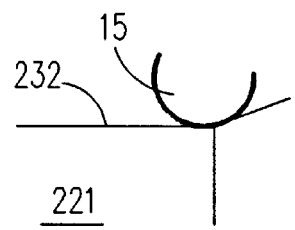
FIG. 10A  FIG. 10B

RAMP FOR USE WITH A DATA STORAGE DEVICE AND A DATA STORAGE DEVICE

BACKGROUND OF THE INVENTION

1. Field of the Invention

The present invention relates to a ramp that evacuates a transducer from a data storage medium while a rotary-disk type data storage device such as a magnetic-disk storage device stops its operation.

2. Description of Related Art

A ramp loading/unloading method is a method which positions a transducer to an evacuation area while a rotary-disk type data storage device such as a magnetic-disk storage device stops its operation. FIG. 1 is a plan view of a conventional magneticdisk storage device 10 found in the prior art which includes the ramp loading/unloading method. A housing 11 houses magnetic disks 17, a rotary actuator assembly 12, a voice coil motor 16, and a ramp 20 and forms hermetic space interiorly. The magnetic disks 17 consist of a plurality of stacked disks which are fastened to a spindle 18. Each disk is rotated with the spindle 18 by a spindle motor (not shown). Both sides of the magnetic disk 17 are used as data recording surfaces. A plurality of stacked suspension arms 14 are coupled to the actuator assembly 12 in correspondence with the number of the data recording surfaces of the magnetic disks 17. Each suspension arm 14 has a slider 19 attached to the front end portion, and a magnetic head (not shown) for scanning the recording surface of the disk is mounted on the slider 19.

The actuator assembly 12 is rotated about a pivot shaft 13 by the voice coil motor 16 so that the slider 19 is positioned over the surface of the magnetic disks 17 and on the ramp 20. The suspension arm 14 is formed from elastic material, and elastic force is applied in the direction where each slider 19 approaches the surface of the disks 17. The rotation of the magnetic disks 17 creates a thin cushion of air that floats the slider 19 off the disk surface, and the floating force and the elastic force applied to the suspension arm 14 are balanced so that the slider 19 maintains a constant distance from the surface of the magnetic disks 17 during rotation. The ramp 20 is arranged near the magnetic disks 17 so that a part of the ramp 20 engages the disks.

FIG. 2 is a perspective view of the ramp 20 shown in FIG. 1. The ramp 20 has a supporting portion 21 and a sliding portion 22 protruding horizontally from the supporting portion 21. The ramp shown in FIG. 2 supports two suspension arms, and correspondingly, the upper and lower recording surfaces of a single magnetic disk. Therefore, in the case where a plurality of magnetic disks are provided, a plurality of ramps with the structure shown in FIG. 2 will be stacked and joined with one another. This ramp is provided with three guiding zones 23 and a landing zone 24 on the upper side of the sliding portion 22. These zones are also formed on the lower side of the sliding portion 22 symmetrically with respect to an X-Y plane horizontally dividing the magnetic disks 17 into two parts. An opening 25 engages the magnetic disks 17 in the state where the ramp 20 is mounted in the magnetic-disk storage device, and the suspension arm 14 is unloaded from the disk surface to the landing zone 24 through some position on the front boundary 26 of the guiding zones, or is loaded from the landing zone 24 onto the disk surface.

When the suspension arm 14 is disengaged from the ramp 20, the position on the magnetic disk 17 where the suspension arm 14 is loaded is important. A dedicated track is formed at the first position on the magnetic disk 17 where the suspension arm 14, disengaged from the ramp 20 after breaking contact with the ramp 20, is positioned. The dedicated track is not used as a recording area and fulfills a role of preventing the loaded slider 19 from destroying recorded data by touching the magnetic disk 17. The suspension arm 14, therefore, needs to land from the ramp 20 onto the magnetic disk 17 at an accurate position. The suspension arm 14 rotates while contacting the guiding zone 23 and the landing zone 24 in a Y-axis direction shown in FIG. 2. The guiding zone 23 extends upward, then flat, and finally downward to the landing zone 24 in the direction from the front boundary 26 to the landing zone 24. The landing zone 24 is adjacent to the upwardly inclined guiding surface 23 and the supporting portion 21, and also the suspension arm 14 is given elastic force in a direction where the arm 14 is pushed against the landing zone 24. Therefore, even if impact force were applied to the actuator assembly 14, there would be no possibility that the suspension arm 14 positioned at an evacuation position on the landing zone 24 would be moved out of the landing zone 24.

FIG. 3 is a sectional view of the ramp 20 and the suspension arms 14 engaging the ramp 20, taken substantially along line A—A of FIG. 1. Blocks 21 are stacked and formed into the single ramp 20, which can evacuate four suspension arms 14 corresponding to two magnetic disks 17. The suspension arm 14 contacts the guiding zone 23 of the ramp 20 through a dimple 15 mounted on the suspension arm 14. A front portion 27 protrudes from the guiding zone 23, as shown in FIG. 3. The purpose of this is to reduce the frictional force between the dimple 15 and the guiding zone 23 and also define a mutual contact position so that a smooth sliding motion of the dimple 15 is obtained when the dimple 15 passes through the boundary between the guiding zones 23 and the boundary between the guiding zone 23 and the landing zone 24.

FIG. 4 illustrates the sectional configuration of another conventional ramp found in the prior art. Even in this example, a guiding zone 23 is formed with a protruding portion 27 that a dimple 15 contacts. Furthermore, FIG. 5 shows a plan view of the ramp shown in FIG. 3 or 4. As shown in FIG. 5, the width of the guiding zones 23 and landing zone 24 of the ramp 20 is defined by two outer and inner circular arcs having the pivot shaft 13 as a center. The boundary between the guiding zones 23 and the boundary between the guiding zone 23 and the landing zone 24 are defined by lines passing through the pivot shaft 13, respectively.

The sliding portion 22 of the ramp 20 shown in FIG. 3 or 4 has both the protruding peripheral portion 27 and the sunken landing zone 24 surrounded by the guiding zone 23 and the supporting portion 21, and furthermore, the circular arc-shaped inner peripheral portion 27 of the guiding zones 23 and the landing zone 24 is shorter than the circular arc-shaped outer peripheral portion 28, as shown in FIG. 5. Therefore, in the case where a ramp and a plurality of sliding zones 22 are molded in one body by a casting mold, the direction in which the casting mold is pulled out cannot be obtained. For this reason, the ramp needs to be divided into a plurality of blocks and molded, and each molded block needs to be assembled by bonding them together. Consequently, since an assembly error is added to an error in the molded dimension of each block, it becomes difficult to determine the accurate landing position of the slider 19 and therefore the width of the dedicated track needs to be widened for compensating the errors. The dedicated track area is a non-recording area, so it wastefully consumes the magnetic disk. For this reason, the dedicated track area needs to be narrowed in every possible way.

In view of the prior art described above, it therefore can be seen that there is a need to provide a ramp for a data storage device which is high in fabrication accuracy and can be easily mounted in the data storage device.

SUMMARY OF THE INVENTION

To overcome the shortcomings of the prior art described above, it is the object of the present invention is to provide a ramp which is high in fabrication accuracy and can be easily mounted in data storage devices. Specifically, in a ramp having a plurality of sliding portions, the object of the invention is to provide a ramp formed in one body. More specifically, the object of the invention is to provide a ramp which has a shape suitable for being integrally molded by a casting mold and which is excellent in the sliding characteristic of the suspension arm and capable of accurately defining the landing position of the suspension arm when mounted in the housing. Also, the object of the invention is to provide a ramp where there is no error in the dimension of the shape with respect to thermal stress. Furthermore, the object of the present invention is to provide a ramp where the slider or the ramp is not damaged, even when impact force is applied to the suspension arm in its evacuation position and therefore the arm leaps up.

Another object of the present invention is to provide a ramp which is capable of improving a process of fabricating a magnetic-disk storage device. Specifically, the object of the invention is to provide a ramp which is capable of removing the actuator assembly from the housing in the state where the ramp is mounted in the housing. Furthermore, the object of the invention is to provide a ramp which can be mounted in a short time at an accurate position within the housing.

Still another object of the present invention is to provide a ramp which prevents a degradation of a casting mold during ramp fabrication by the casting mold and also is excellent in sliding characteristic.

Yet another object of the present invention is to provide a rotary-disk type data storage device, such as a magnetic-disk storage device, which uses a ramp that achieves the aforementioned objects.

Briefly stated, the present invention is a ramp which is mounted in a data storage device such as a magnetic-disk storage device comprising a plurality of rotary-disk type data storage media stacked, a transducer for transferring data between it and the rotary-disk type data storage medium, a suspension arm having the sensing element mounted thereon, and a rotary actuator assembly coupled to the suspension arm. The ramp also contacts the suspension arm so as to be slidable to evacuate the transducer. The ramp of the present invention comprises a supporting portion, a first sliding portion, having a landing zone, protruded from the supporting portion, and a second sliding portion, having a landing zone, protruded from the supporting portion. The second sliding portion is separated in space from the first sliding portion. The supporting portion, the first sliding portion, and the second sliding portion are formed in one body. Therefore, in the ramp of the present invention, an assembly error can be reduced as compared with the case where a plurality of formed blocks are assembled together, and also the process of assembling the blocks can be omitted. Forming in one body means a method which obtains a final structure of the ramp by processing raw materials, casting mold and so forth, and excludes a method which obtains a final structure of the ramp by dividing the final structure into a plurality of blocks firstly, then forming each block independently, and lastly uniting the formed each block with adhesion, deposition, or rivet welding.

Furthermore, in the ramp of the present invention, the landing zones of each sliding portion are formed symmetrically with respect to a plane including a surface which horizontally divides a magnetic disk into two parts. Therefore, the suspension arms which access a magnetic disk having both surfaces as recording areas can be evacuated symmetrically by a single sliding portion.

Among boundaries which define the first guiding zone, the landing zone, and the second guiding zone of each of the first and second sliding portions, the boundaries formed in a direction intersecting with the direction in which the suspension arm rotates are formed parallel respectively to a predetermined reference line. The reference line is aligned with a direction in which one of two casting molds for molding the first and second sliding portions is pulled out. Among surfaces constituting the supporting portion, the surfaces which are molded by the same casting mold as the first and second sliding portions are all molded so as not to disturb the pulling-out of the casting mold. In this way, the ramp of the present invention has a structure suitable for molding the support portion, the first sliding portion, and the second sliding portion by a casting mold in one body. With this structure, even when the sliding portion forms a recess portion with the landing zone and the guiding zones adjacent to the landing zone, there is no possibility that the pulling-out of casting molds will be disturbed by the protruding portion of the casting mold for forming the recess portion, and consequently, casting molds can be easily pulled out in the direction of the reference line.

In the ramp of the present invention, the reference line is selected as a center line of the actuator assembly to which the suspension arm was coupled, in the state where the suspension arm is positioned in a direction further away from the magnetic disk than the boundary between the first guiding zone and the landing zone. With this, in addition to the advantage that integral molding can be performed by a casting mold, the contact position of the suspension arm is smoothly positioned at the front portion of the boundary at all times, when the suspension arm passes through the boundary between the guiding zone and the landing zone while sliding, and consequently, a favorable sliding characteristic is obtainable. In the boundary where the guiding zone nearest to the magnetic disk is partitioned from space, the last disengaging position and the first contacting position of the suspension arm with respect to the ramp are always located at the front end of each boundary, when the suspension arm is loaded or unloaded. Consequently, the landing position on a magnetic disk can be accurately defined. In the range where the suspension arm is positioned for determining the reference line, the limit of the side where the suspension arm goes away from the magnetic disk is prescribed from the requirements of the ramp molding technique. However, in the present invention, the limit can be set to a range where the sliding zone can be molded by a casting mold. It is preferable that the limit is near the evacuation position of the suspension arm. Also, if the limit is determined solely for the purpose of obtaining a boundary which accurately defines the last disengaging position of the suspension arm, the limit of a side near to the magnetic disk can be determined by positioning the suspension arm near the boundary where the guiding zone nearest to the magnetic disk is partitioned from space.

In the ramp of the present invention, the boundary, which extends along the direction in which the suspension assembly rotates and which also partitions the first guiding zone, the landing zone, and the second guiding zone of each of the first and second sliding portions from space, is formed into a circular arc which has a rotational axis of the actuator assembly as its center. For this reason, if the position at which the suspension arm contacts the guiding zones and the landing zone is set to the vicinity of the boundary formed along the circular arc, the suspension assembly can be stably slid in the vicinity of the boundary at all times.

The supporting portion is formed with material whose thermal expansion coefficient is low, and the sliding portion is formed with material whose sliding characteristic is favorable. Therefore, the ramp of the present invention limits deformation of the supporting portion which is caused by thermal expansion from thermal stress produced in the magnetic disk, and also keeps the sliding characteristic of the sliding portion favorable.

In the ramp of the present invention an impact limiting member is provided in the space between the first sliding portion and the second sliding portion. For this reason, even if the spacing between the landing zones of the first and second sliding portions were wide, the impact limiting member would limit the height that the suspension arm held in the evacuation position leaps up due to impact force, and protect the slider and the landing zone from collision damage.

The ramp of the present invention is formed to secure a passage of the suspension arm passing through the ramp when the actuator assembly is rotated in a direction away from a magnetic disk. Therefore, even if a plurality of suspension arms engaged the sliding portion, the actuator assembly could be removed at a position where the arms do not engage the ramp, by rotating the actuator assembly until it passes through the ramp.

In the ramp of the present invention, the supporting portion has three mounting reference surfaces, which are engageable with reference surfaces formed on the housing. Consequently, the ramp can be mounted in a short time at an accurate position of the housing.

The ramp of the present invention is molded by a casting mold from a polymer containing polytetrafluoroethylene (PTFE) which gives an excellent sliding characteristic between the ramp and the suspension arm. Therefore, a thin layer where nearly no fluorine is detected by an electron spectroscopic analyzer (ESCA) is formed on the surface of the ramp. The thin layer doesn't provide degradation and detrimental influence for reuse of the casting mold. Furthermore, this thin layer comes off by sliding the suspension arm several times, and consequently, an inner layer containing PTFE is exposed and maintains a favorable sliding characteristic. Here, the "nearly no fluorine is detected" means that when an elemental analysis is made with ESCA, the ratio from a background to the peak value of fluorine with respect to the background shows a value less than about 40%.

BRIEF DESCRIPTION OF THE DRAWINGS

FIG. 9 is a sectional view taken substantially along line B—B of FIG. 6;

FIGS. 10(a) and (b) are a plan view and a sectional view respectively showing how the guiding zone and the dimple contact each other;

DETAILED DESCRIPTION OF THE PREFERRED EMBODIMENT

This invention is described in a preferred embodiment in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
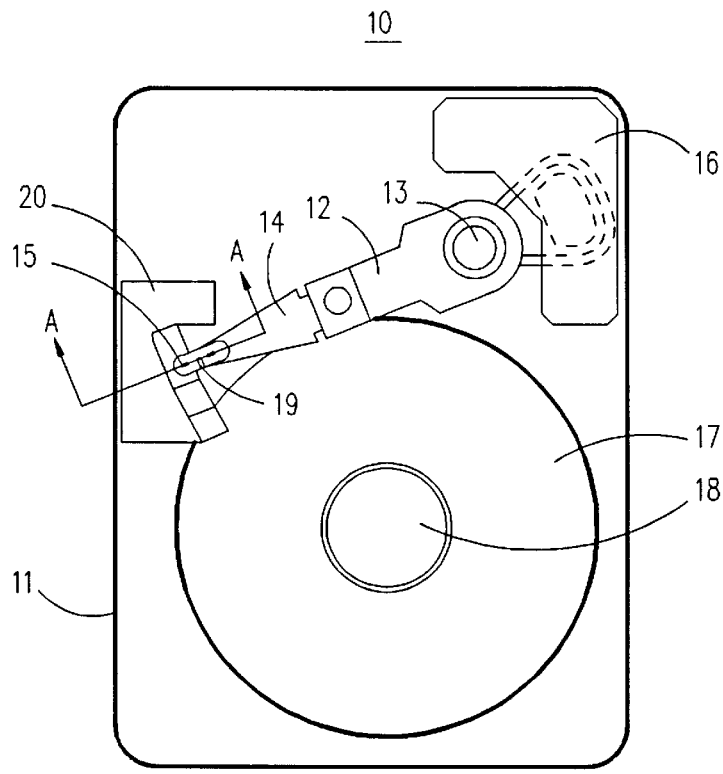
FIG. 1 is a plan view of a conventional magnetic-disk storage device incorporating a ramp loading method found in the prior art.
Figure 2:
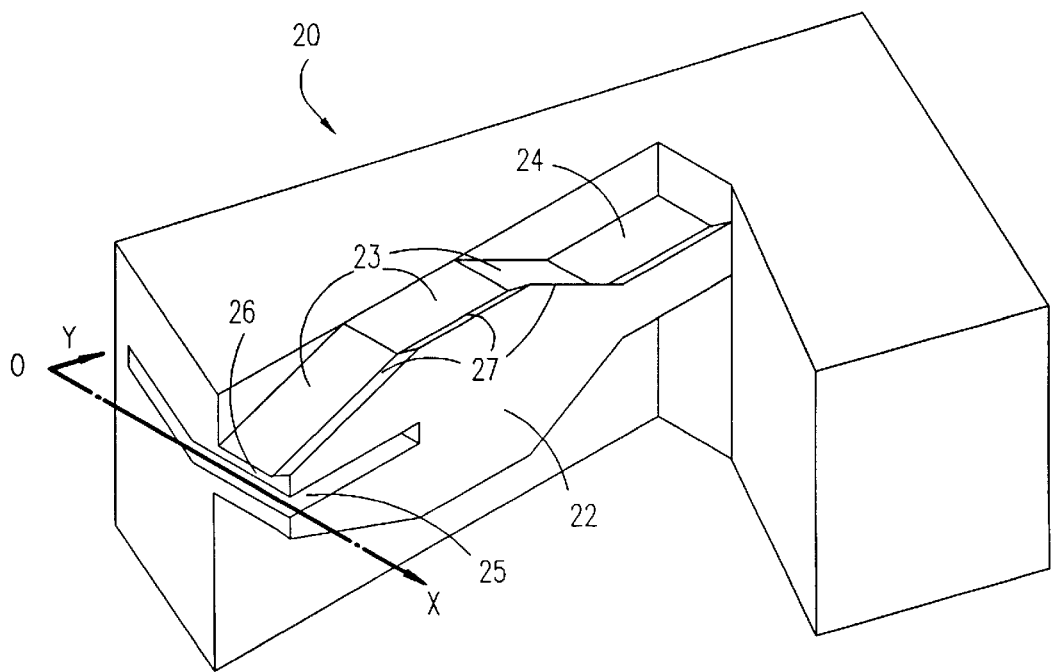
FIG. 2 is an enlarged perspective view showing the ramp of FIG. 1.
Figure 3:
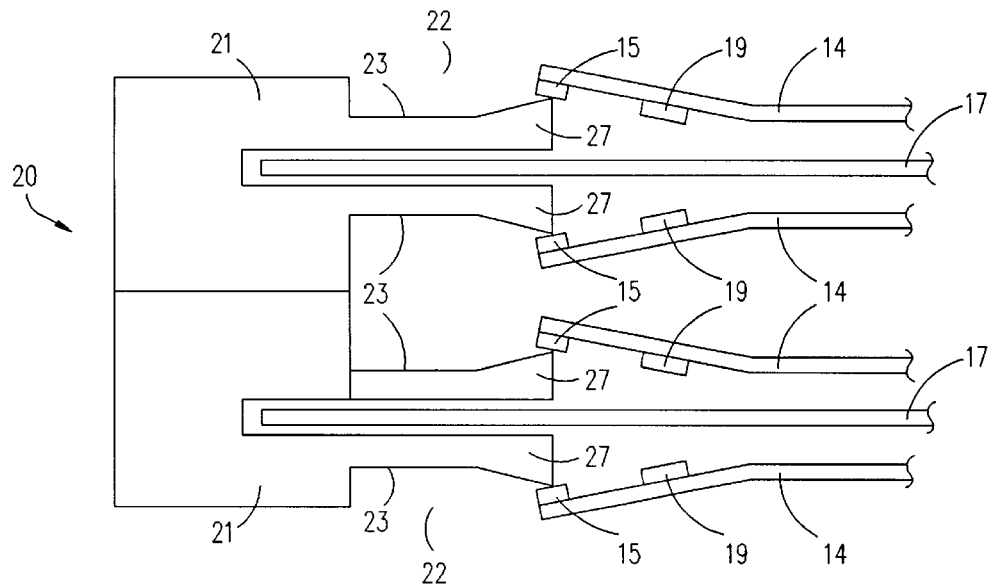
FIG. 3 is a sectional view taken substantially along line A—A of FIG. 1.
Figure 4:
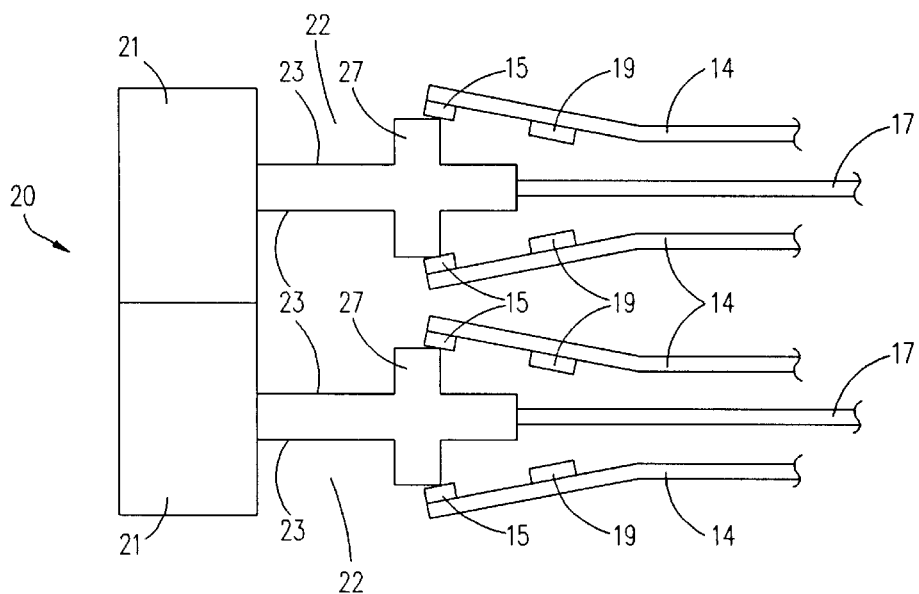
FIG. 4 is a view similar to FIG. 1 but showing another example of the ramp shown in FIG. 1.
Figure 5:
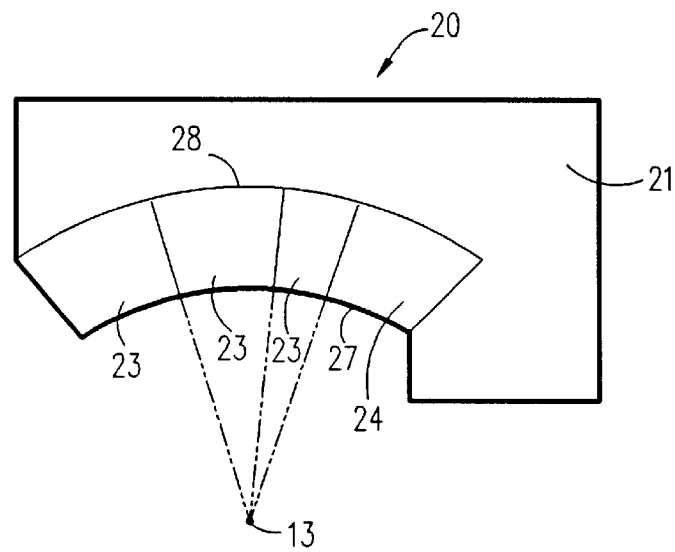
FIG. 5 is a plan view of the conventional ramp shown in FIG. 3 or 4.
Figure 6:
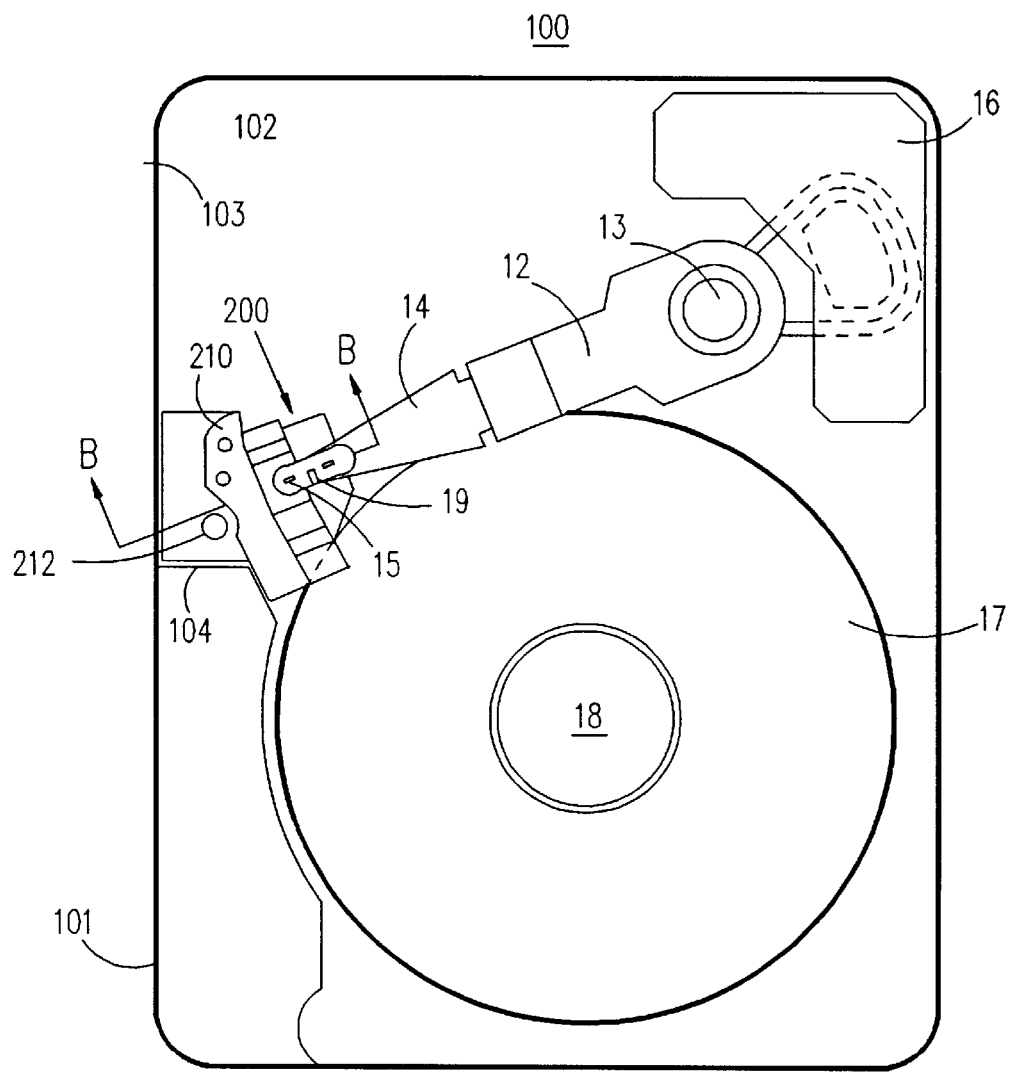
FIG. 6 is a plan view of a magnetic-disk storage device which includes a ramp according to the present invention.

FIG. 6 is a plan view of a magnetic-disk storage device provided with a ramp according to the present invention. The same reference numerals will be applied to parts which perform the same operation as FIG. 1 and therefore the description is omitted. In this embodiment, two magnetic disks 17 are stacked with a space between them. A magnetic-disk storage device 100 is equipped with a housing 101, which is equipped with a base 102 and wall surfaces 103 and 104 extending perpendicular from base 102. A ramp 200 is adjacent to the magnetic disk 17 and fixed to the base 102 at a position abutting the wall surfaces 103 and 104.

Figure 7:
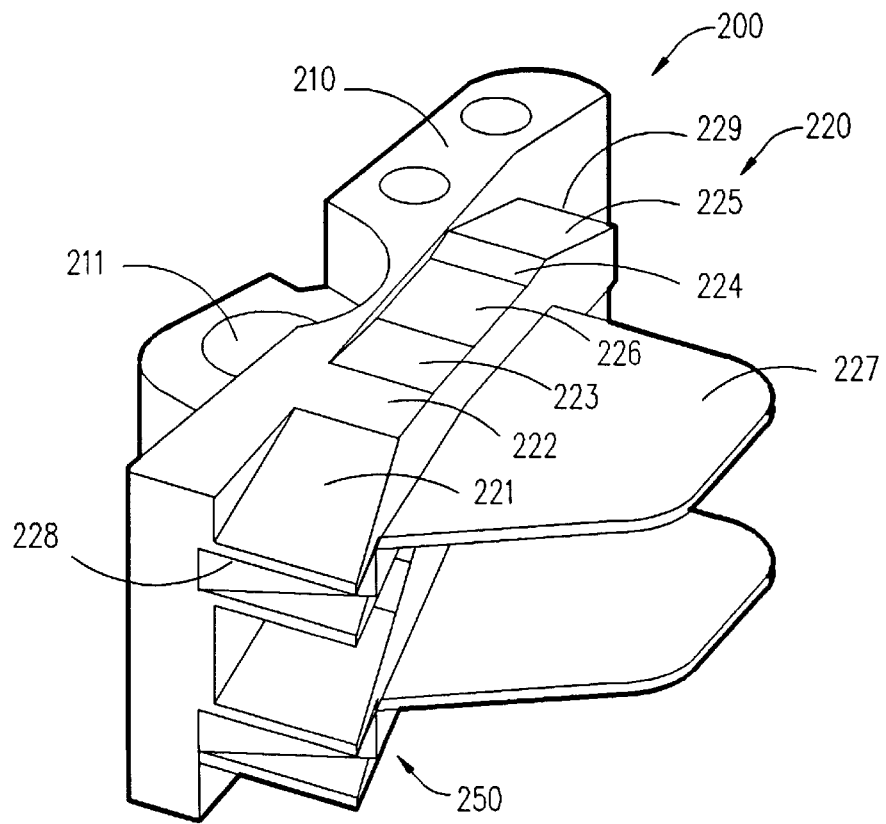
FIG. 7 is an enlarged perspective view showing the ramp of FIG. 6.

FIG. 7 shows a perspective view of the ramp 200. The ramp 200 has a supporting portion 210 and sliding portions 220 and 250. The supporting portion 210 is provided with a bolt hole 211 for fixing the ramp 200 to the base 102. The upper sliding portion 220 and the lower sliding portion 250 are formed into the same configuration. The upper sliding portion 220 is used to evacuate a pair of suspension arms corresponding to the upper one of the two magnetic disks 17, and the lower sliding portion 250 is used to evacuate a pair of suspension arms corresponding to the lower magnetic disk 17. The upper sliding portion 220 has guiding zones 221 through 225 and a landing zone 226. The guiding zones 221 and 223 extend obliquely upward to the flat guiding zone 222. Also, the guiding zones 223 and 224 extend obliquely downward to the landing zone 226. Furthermore, the guiding zone 225 extends obliquely upward to the guiding zone 224.

The guiding zones 222 and the landing zone 226 are formed approximately horizontal to the base 102. When unloaded, the suspension arm 14 is first moved from the magnetic disk 17 to a predetermined position on the front boundary 228 of the ramp 200, then passes the guiding zones 221, 222 and 223, sliding on the zones, and finally is moved to the landing zone 226. The guiding zones 223 and 224 extend obliquely downward to the landing zone 226. Additionally, elastic force is applied to the suspension arm 14 to press the arm against the landing zone 226, so that even if impact force were applied to the suspension arm 14 evacuated in the landing zone 226, the suspension arm 14 would be held in the landing zone 226. The sliding portion 220 is further provided with a separator 227, which guarantees that one slider does not contact another slider when the suspension arm 14 is lifted by impact force applied during evacuation of the arm onto the ramp.

Figure 8:
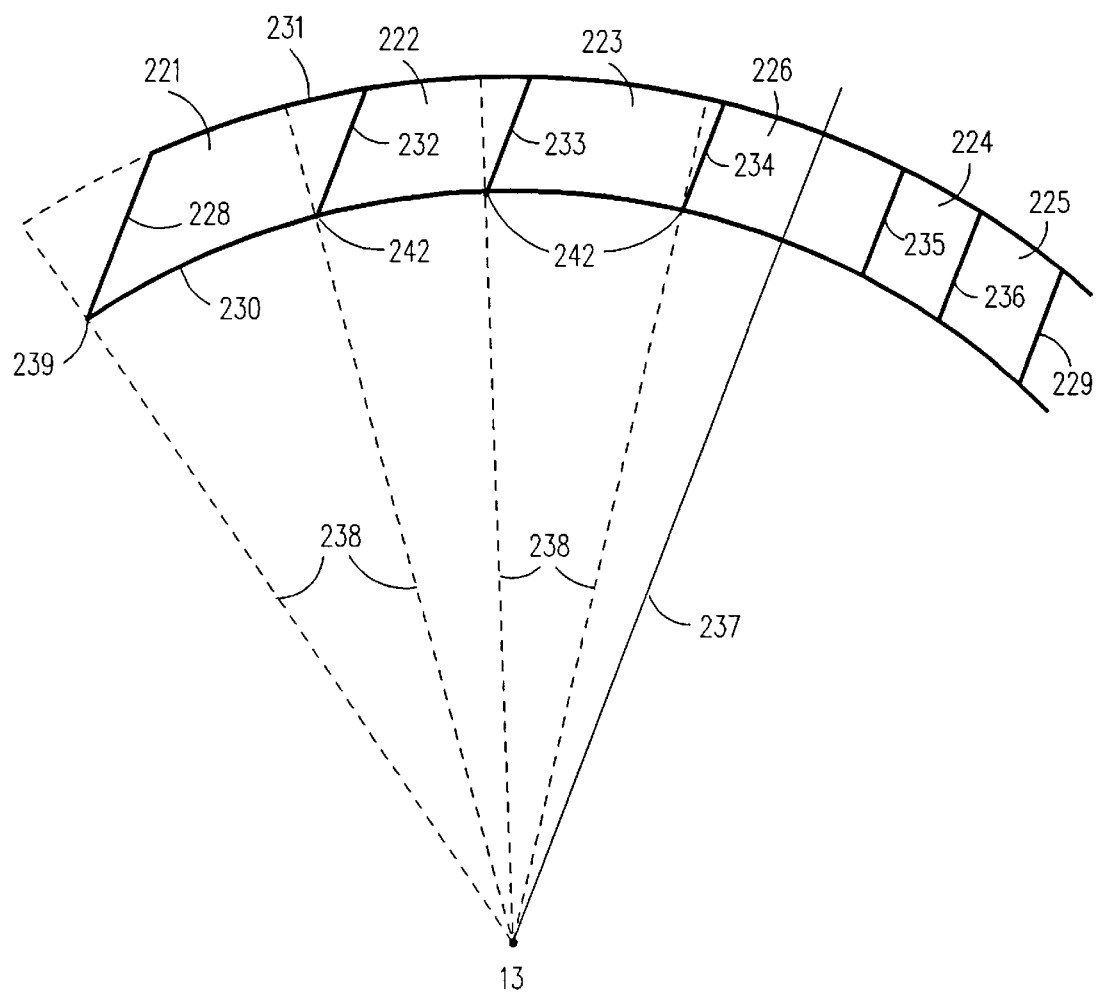
FIG. 8 is a plan view showing the guiding zones and the landing zone of the ramp shown in FIG. 6.

FIG. 8 is a plan view for describing in detail the configurations of the guiding zones and the landing zone of the ramp 200. A reference line 237 passing through the pivot shaft 13 is selected as the evacuation position of the suspension arm 14. The guiding zones and the landing zone are defined by four boundaries, respectively, and the zones are formed into flat surfaces so that the ramp 200 can be integrally molded by a casting mold. Boundaries 230 and 231 defining the circumferential boundaries of the guiding and landing zones are formed along two inner and outer circular arcs having the pivot shaft 13 as the centers. It is preferable to form the circumferential boundary 230 into a circular arc rather than a polygonal line, because the dimple slides at a constant position on each zone along the boundary 230 so that a smooth sliding characteristic can be obtained. Radial boundaries 228, 232, 233, 234, 235, 236, and 229 are formed parallel to the reference line 237, and consequently, a casting mold can be pulled out in a direction along these boundaries. Among two half casting molds engaging each other to form the ramp integrally, in order that the half casting mold for forming the sliding portions 220 and 250 can be pulled out in the direction of line 237, necessary portions of the supporting portion 210 and the other portions which are formed by the same half casting mold have to be formed in parallel to the line 237, but generally no obstacle will occur in forming the necessary portions other than the sliding portions in parallel. At deflection points 242 where the circumferential boundary 230 and the radial boundaries cross each other, the boundary 230 varies according to a variation from one zone to other zone. In the present invention, the configuration of the outer circumferential boundary 231 is not important, but the configurations of the inner circumferential boundary 230 and the radial boundaries 228, 232, 233, and 234 are important for a sliding characteristic. The configurations of the radial boundaries 235, 236, and 229 are important for integral molding. A description will be made of the importance of the radial boundaries.

FIG. 9 is a sectional view of the ramp taken substantially along line B—B of FIG. 6. The dimple 15 provided on the suspension arm 14 contacts the ramp 200 at an intersecting point between the boundaries 232 and 230 of FIG. 8. The guiding zones 221, 222, and 223 and the landing zone 226 are changed at the radial boundaries 232, 233, and 234. Since the dimple 15 slides on the sliding portion 220 with a small constant frictional force, it is preferable that the dimple 15 contact the inner circumferential boundary 230 at all times while sliding. However, the guiding zones and the landing zone in the present invention do not have the protruding portions near the boundary 230 which were adopted in the prior art for enabling integral molding by a casting mold, so actually the dimple 15 contacts the guiding zones at a certain small area near the boundary 230.

FIGS. 10(*a*) and 10(*b*) are a plan view and a sectional view showing how the guiding zone 222 and the dimple 15 contact each other, a boundary 241 being added for comparison between the present invention and prior art. An area 240 is a possible range in which the dimple 15 contacts the guiding zone 222, however which point the dimple 15 contacts within the contact area 240 in the assembled state of the magnetic-disk storage device cannot be specified. It is preferable that the dimple 15 contact at a contact point (a) at all times, but there is also the possibility that it will contact at a contact point (b). Here, when the suspension arm 14 is moved in a direction of arrow C of FIG. 10(*a*) for loading it from the ramp 200 to the magnetic disk 17, it is supposed that the dimple 15 slides on the ramp while contacting the guiding zone 222 at the contact point (b). In the conventional ramp, as previously described, the boundary 241 between the guiding zones was formed on the line 238 passing through the pivot shaft 13. When the boundary line 241 is on the line 238, the dimple slides on the guiding zone 222 while contacting at the contact point (b). However, if the dimple arrives on the boundary 241, the guiding zone 222 will be changed suddenly to the guiding zone 221 and therefore there will be no guarantee that the dimple will continue to contact at the contact point (b) successively even in the guiding zone 221. In some cases an abrupt change in the contact point of the dimple gives the suspension arm 14 a discontinuous frictional force and causes it to leap up.

The boundary 232 of the present invention is formed parallel to the reference line 237 of FIG. 8 and forms an angle of α between it and the conventional boundary 241, as shown in FIG. 10(*a*). The contact area 240 of the dimple 15 is moved in the direction of arrow C, while contacting the guiding zone 222 at the contact point (b), and arrives at the boundary 232. If the contact area 240 tries to move further in the direction of arrow C after the contact point (b) of the contact area 240 arrives at the boundary 232, the contact point of the dimple will move from the contact point (b) to the side of the contact point (a) at the boundary 232, and the dimple will contact the contact point (a) at the deflection point 242 and move to the guiding zone 221 via the boundary 230. Thereafter, when the dimple slides on the guiding zone 221, there is the possibility that the contact point of the dimple will move gradually from the contact point (a) to another contact point within the contact area 240, however, when the dimple moves on the guiding zones, the contact point always slides on the boundary between the guiding zones and passes through the deflection point 242 and therefore there is no possibility that the contact point will vary discontinuously, as it does in the conventional ramp having the boundary 241. Consequently, there is no possibility that the suspension arm will leap up at the boundary while sliding, and a smooth sliding characteristic is obtainable.

Forming the radial boundary 228 in parallel to the line 237 has the advantage that the landing point of the slider 19 onto the magnetic disk 17 can be accurately determined. As previously described, when the suspension arm 14 moves on the ramp 200 for loading, the dimple 15 passes through the deflection point 242 whenever it passes through the radial boundary, so the dimple 15 passes through the point 239 when passing through the front boundary 228. Consequently, the position on the ramp where the suspension arm 14 disengages from the ramp 200 or the position on the ramp where the suspension arm 14 first engages from the magnetic disk 17 becomes the point 239 at all times. Therefore, the width of the aforementioned dedicated track of the magnetic disk 17 can be determined based on only precision between the position of the point 239 in the magnetic-disk storage device and the relative position of the magnetic disk. It is important that the range of the reference line 237 is determined so that each of the boundaries 228, 232, 233, and 234 makes an angle α (FIG. 10(*a*)) with the line 238. Therefore, the reference line 237 can be selected in a range which is rotated on the pivot shaft 13 in a direction further away from the magnetic disk 17 than the position at which the suspension arm 14 contacts the boundary 234. However, if the angle α becomes large, the angle at which the boundary 228 protrudes from the supporting portion 210 will be acute and molding by a casting mold will be difficult, and consequently, this point of view will set a limit on the range of the reference line 237. If the position on the ramp 200 where the suspension arm 14 disengages finally from the ramp 200 or the position on the ramp where the suspension arm 14 firstly engages from the magnetic disk 17 is determined solely for the purpose of defining that position at the point 239, the range of the reference line 237 can be enlarged up to a range near the line 238 linking the pivot shaft 13 and the point 239 together.

In the ramp 200 of the present invention, the supporting portion 210 and the sliding portions 220 and 250 can be integrally molded by a casting mold from a liquid crystal polymer with an excellent frictional characteristic, which is available with a commodity name of "A430 VECTRA" from Polyplastic Company. If a liquid crystal polymer contains polytetrafluoroethylene (PTFE), it is known that a favorable sliding characteristic with low friction is applied between the ramp 200 and the suspension arm 14. However, if the ramp 200 is mounted in the magnetic-disk storage device, a liquid crystal polymer will thermally expand due to a temperature rise in the device and therefore errors will easily occur in the dimensions of each part. Therefore, in a ramp with a large outside dimension, it is desired that the ramp maintain a stable outside dimension with respect to thermal stress and also exhibit a low frictional coefficient between it and the dimple 15 of the suspension arm 14. In another embodiment of the ramp 200 of the present invention, the aforementioned desire is achieved by forming the supporting portion 210 from a thermoplastic polyimide with a low thermal expansion coefficient, which is available with a commodity name of "Ohram JCN 3030" from Mitsui-Toatsu Company, and also by forming the sliding portions 220 and 250 from a liquid crystal polymer, which is available with a commodity name of "A430 VECTRA" from Polyplastic Company. An integral molding method using two materials is well known. For example, the supporting portion 210, which has recess portions into which the sliding portions 220 and 250 are fitted, is firstly molded from a thermoplastic polyimide, and then the molded supporting portion is used as a casting mold to pour a liquid crystal polymer into the recess portions so that the sliding portions are molded. In this way, two materials can be formed in one body with each other. The material with a low thermal expansion coefficient, which is applicable to the ramp 200 of the present invention, is not limited to the aforementioned examples but includes other materials, such as a polyimide containing carbon fibers and a polymer containing carbon fibers.

Figure 11:
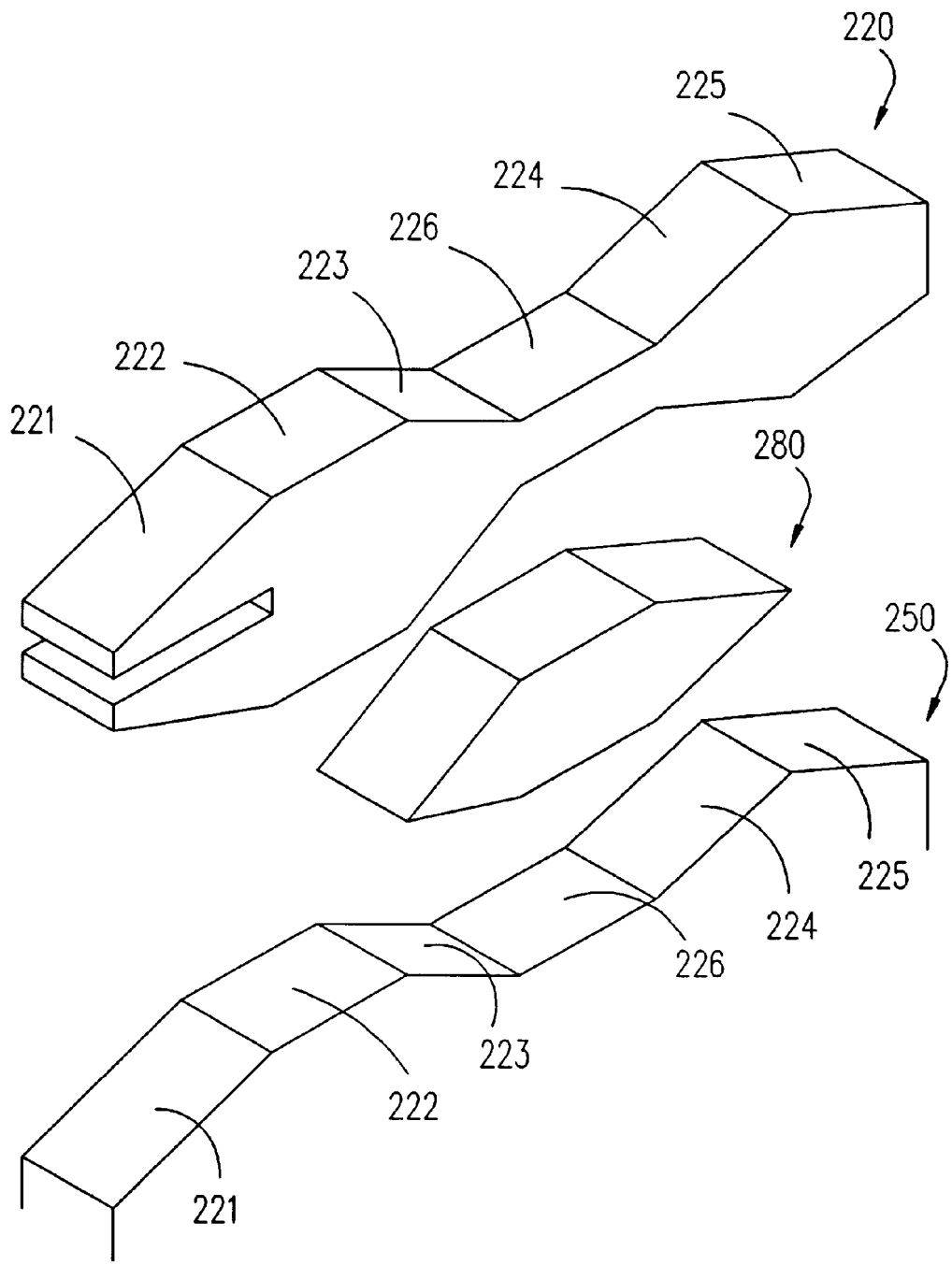
FIG. 11 is a part-perspective view of a ramp equipped with an impact limiting member.

FIG. 11 is a part-perspective view of a ramp having an impact limiting member 280, the supporting portion 210 and the separators 227 being omitted. The impact limiting member 280 is formed so as to protrude from the supporting portion 210 into the space between the sliding portions 220 and 250. The space between the mutually opposed landing zones 225 of the sliding portions 220 and 250 is wide compared with the mutually opposed guiding zones 222, because the guiding zones 223 and 224 extend obliquely downward to the landing zone 226. The suspension arm 14 is evacuated to the landing zone 226 while elastic force is being applied so that the suspension arm 14 is pushed against the landing zone 226. However, if a strong vertical impact force is applied in the vertical direction of the suspension arm 14, there will be cases where the suspension arm 14 will leap up in the vertical direction. At the evacuation position, the space where the suspension arm 14 leaps up is wide compared with the guiding zones. For this reason, the suspension arm 14 is given large positional energy by vertical impact force, so there are cases where the slider 15 will collide against the separator 227 with a strong force and be damaged or where the sliding portion 220 or 250 of the ramp 220 will be damaged by the suspension arm 14. The impact limiting member 280 is provided for limiting the space that the suspension arm 14 leaps up, when vertical impact force is applied to the suspension arm 14 held in the evacuation position.

Now, a description will be made of the features that the ramp 200 of the present invention exhibits in the fabrication process of the magnetic-disk storage device. In the suspension assembly 12 consisting of a magnetic head, a slider, and a suspension, there are cases where defects are found in the final test stage after the magnetic-disk storage device is assembled. In the conventional ramp, since movement of the suspension assembly is limited only to the space defined by the ramp and the spindle of the magnetic disk, the ramp has to be removed for exchanging the suspension assembly. Therefore, it takes substantial time to accurately position and reattach the ramp. In the ramp 200 of the present invention, the rear boundary 229 in FIG. 8 is released to space, as shown in FIG. 7. This renders exchange of the actuator assembly 12 or the suspension arm 14 possible without removing the ramp 200 from the housing, by rotating the actuator assembly 12 manually in a direction away from the magnetic disk 17 during stoppage of the magnetic-disc drive in FIG. 6. Furthermore, since the guiding zone 225 is formed so as be inclined upward with respect to the guiding zone 224, it is easy to insert the suspension assembly 12 into the ramp 200 through the rear boundary 225.

The next feature that the ramp 200 of the present invention exhibits in the fabrication process is related to the mounting precision of the ramp 200 onto the housing 101. As evident in the aforementioned description, in order to narrow the dedicated track area, it is necessary to enhance the fabrication precision of the ramp 200 itself and the mounting precision of the ramp 200 onto the housing 101. In FIG. 6 there is shown the mounted state of the ramp 200 of the present invention. At the mounted position of the ramp 200, the housing 101 is equipped with reference surfaces formed on the base 102 and the wall surfaces 103 and 104. The reference surfaces is defined a positional relationship with, such as the heights of the pivot shaft 13, the spindle 18, and the magnetic disk 17. The supporting portion 210 of the ramp 200 has three reference surfaces which are joined together with the three reference surfaces formed on the housing 101 at the mounting position. The ramp 200 can be slid on the base 102 until it contacts the wall surfaces 103 and 104, so the ramp 200 can be positioned accurately and quickly when assembled.

Furthermore, a description will be made of the ramp 200 which can be integrally molded by a casting mold so as to avoid an adverse influence on the casting mold in the fabrication process of the ramp 200. The ramp 200 of the present invention employs a liquid crystal polymer which contains PTFE and is excellent in frictional characteristic, such as that available with a commodity name of "A430 VECTRA" from Polyplastic Company. The liquid crystal polymer in a molten state is poured into a casting mold to mold the ramp. Fluorine contained in PTFE gives the suspension arm 14 a favorable sliding characteristic, however in the case where the melting point of PTFE is lower than that of the base polymer, PTFE moves early within a casting mold, arrives at the surface of the casting mold, and adheres to the surface. The PTFE adhered on the inner surface of the casting mold will be an obstacle to smooth formation of the surface of the ramp 200 when the casting mold is repeatedly used. Also, fluorine produced from PTFE accelerates a degradation of the casting mold. On the other hand, in the case where the melting point of the base polymer is lower than that of PTFE, the base polymer arrives early at the surface of the casting mold and PTFE does not exist on the surface of the ramp 200. The ramp 200 of the present invention uses a liquid crystal polymer of a commodity name of A430 VECTRA and molds the ramp 200 so that PTFE is not detected in a range from the surface of the ramp to a position about a few nanometers away in depth from the surface. By covering the surface of the ramp 200 with a thin layer where no PTFE is detected, a detrimental influence on the casting mold can be avoided. On the other hand, by sliding the suspension arm 14 on the ramp 200 several times to expose the thin layer where PTFE exists, a favorable sliding characteristic is obtainable.

Figure 12:
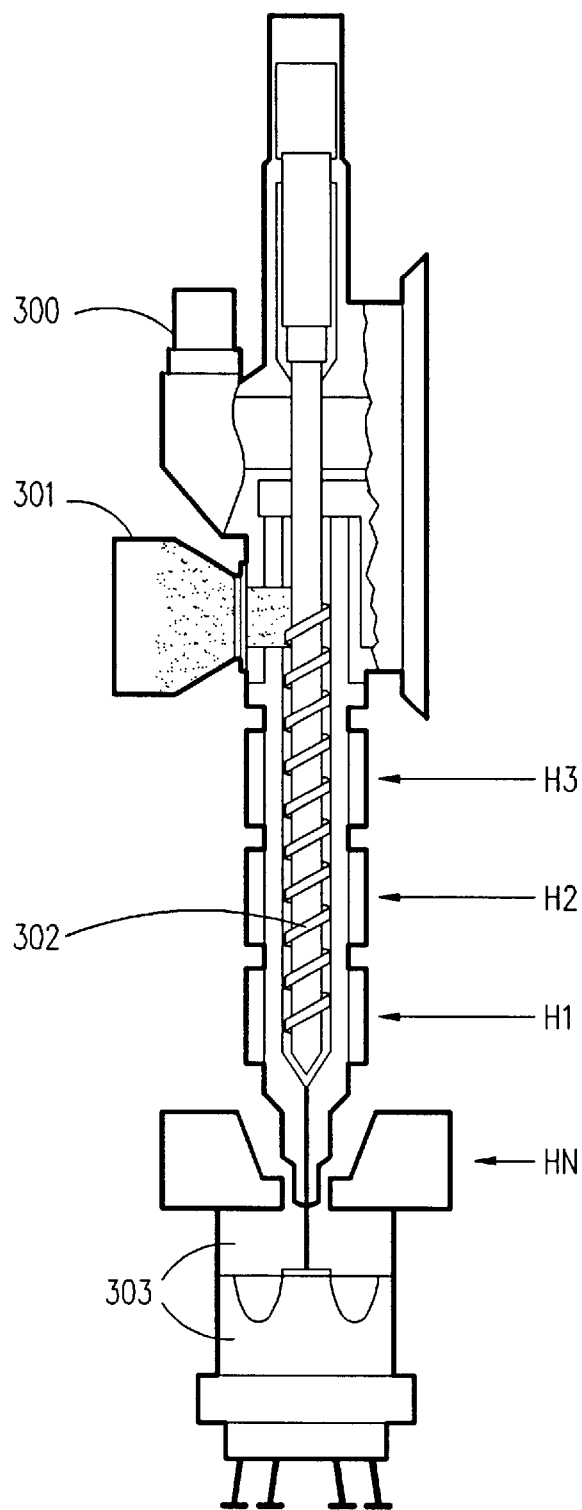
FIG. 12 is a schematic view showing a molding machine for ramp formation.

FIG. 12 is a schematic view of a molding machine 300 when the ramp 200 is molded so that the thin layer where no fluorine is detected is formed on the surface of the ramp 200, by employing a commodity name of A430 VECTRA. The molding machine employs PS40E-5ASE made by Nissei Resin Industry. A liquid crystal polymer containing PTFE is poured from a hopper 301 and then is pressed and injected into the casting molds 303 by a screw section 302. For the temperature of each part of the screw section 302 while molding, an electric heater (not shown) is maintained to 280° C. at a position of HN, 290° C. at a position of H1, 270° C. at a position of H2, and 265° C. at a position of H3, and the temperature of the casting mold 303 is maintained to 82° C. at a position of HN. The injection pressure to the casting mold 303 is set to 352 kg/cm². A liquid crystal polymer is injected into the casting mold 303 and then is cooled within the casting mold 303 for 8 sec.

An elemental analysis has been made with ESCA from the surface of the ramp fabricated under the aforementioned molding conditions to a certain depth, and the following results have been obtained. ESCA generally is used in an elemental analysis from the surface of a substance to a depth of about a few nanometers. An ESCA called an M-probe was used for this analysis, which was made by Surface Science Institute. The analysis conditions are as follows: (1) Spectrum: Scanned, (2) BE range: 676–696, (3) Data Point: 200, (4) eV/Point: 0.1, (5) Scans: 5, (6) Resolution: 4, (7) Spot Size: 400 1000 æm, (8) Charge Gun: 2.00, and (9) X-rays: Mono. As a consequence, the ratio from a background to the peak value of fluorine with respect to the background was less than about 40% and nearly no fluorine was detected. On the other hand, when the surface of the same ramp was analyzed with SEM/EDX (scanning electron microscope/ energy dispersion type X-ray analyzer) which is known as an apparatus which can make an elemental analysis from the surface of a substance to a depth of about a few micrometers, the ratio from a background to the peak value of fluorine with respect to the background showed a value of more than 10 times and was nearly the same as material before molding. At this time, the SEM and EDX are S-4000 made by Hitachi and DELTA made by Kevex. The analysis conditions are as follows: (1) Mode: XES, (2) Live Time: 100 sec, (3) Size: 1K channels, (4) Range: 10.23 KeV/ch, (5) Time Constant: 12 sec, and (6) Gain: Medium. As the result of the aforementioned analysis using ESCA and SEM/EDX, the ramp molded under the aforementioned special conditions shows that the surface of the original material is covered with a thin layer where there is no fluorine, i.e., PTFE.

While the embodiment of the present invention has been described with an example of the ramp applied to a magnetic-disk storage device, the present invention is not limited to this example but it is also applicable to rotary-disk type data storage media and data storage devices equipped with a rotary actuator which accesses the rotary-disk type data storage media.

The present invention provides a ramp which is high in fabrication accuracy. Specifically, in a ramp having a plurality of sliding zones, the ramp can be formed in one body. More specifically, the present invention provides a ramp which has a shape suitable for being integrally molded by a casting mold which is excellent in the sliding characteristic of the suspension arm, and capable of accurately defining the disengaging position and the contacting position of the suspension arm when mounted in the housing. Also, the invention provides a ramp where there is no dimensional error in the shape even with respect to thermal stress. Furthermore, the invention provides a ramp where there is no damage to the slider or the ramp, even when impact force is applied to the suspension arm in the evacuated position causing the arm to leap.

In accordance with the present invention, a ramp is provided which is capable of improving a process of fabricating a magnetic-disk storage device. Specifically, there can be provided a ramp which is capable of removing an actuator assembly from a housing in the state where the ramp is mounted in the housing. Furthermore, there can be provided a ramp which can be mounted in a short time at an accurate position within the housing.

Furthermore, according to the present invention, a ramp is provided which prevents a degradation of a casting mold during ramp fabrication by the casting mold, and also which is excellent in sliding characteristic.

According to the present invention, a magnetic-disk storage device is provided that uses the ramp achieving the aforementioned objects.

While the present invention has been particularly shown and described with reference to the preferred embodiments, it will be understood by those skilled in the art that various changes in form and detail may be made without departing from the spirit, scope and teaching of the invention. Accordingly, the disclosed invention is to be considered merely as illustrative and limited in scope only as specified in the appended claims.

What is claimed is:

1. A ramp which is mounted in a magnetic-disk storage device comprising a plurality of magnetic disks stacked, a magnetic head for transferring data between it and one of the magnetic disks, a suspension arm having the magnetic head mounted thereon, and a rotary actuator assembly coupled to the suspension arm, the suspension arm being slidably in contact with the ramp molded by a casting mold to evacuate the magnetic head thereto, the ramp comprising:

a supporting portion;

a first sliding portion protruded from said supporting portion, said first sliding portion having a first guiding zone, a landing zone, and a second guiding zone, each zone substantially being flat; and a second sliding portion protruded from said supporting portion, said second sliding portion having a first guiding zone, a landing zone, and a second guiding zone, each zone substantially being flat, and being separated in space from said first sliding portion;

wherein the first guiding zone, the landing zone, and the second guiding zone of each of said first and second sliding portions are arranged adjacently in order in a direction where the suspension arm rotates, and the first guiding zone and the second guiding zone are formed so as to be inclined downward in a direction of the landing zone; and wherein among boundaries which define the first guiding zone, the landing zone, and the second guiding zone of each of said first and second sliding portions, the boundaries formed in a direction intersecting with the direction in which the suspension arm rotates are formed parallel to a predetermined reference line;

the reference line is aligned with a direction in which the casting mold for molding the first and second sliding portions is pulled out; and among surfaces constituting said supporting portion, the surfaces which are molded by the casting mold are all molded so as not to disturb the pulling-out of the casting mold for molding the first and second sliding portions in the direction aligned with the reference line;

and further wherein said supporting portion is formed with material whose thermal expansion coefficient is low and wherein said first and second sliding portions are formed with material whose frictional coefficient is low.

2. The ramp as set forth in claim 1, wherein said material whose thermal expansion coefficient is low, is either a polymer containing carbon fibers or a polyimide containing carbon fibers and wherein said material whose frictional coefficient is low is a polymer containing polytetrafluoroethylene (PTFE).

3. A magnetic-disk storage device comprising:

a rotary actuator assembly to which a suspension arm is coupled;

a plurality of magnetic disks stacked;

a ramp arranged near said magnetic disks for evacuating the suspension arm; and a housing for housing said actuator assembly, said magnetic disks, and said ramp;

wherein said ramp is comprised of
a supporting portion;

a first sliding portion protruded from said supporting portion, said first sliding portion having a first guiding zone, a landing zone, and a second guiding zone, each zone substantially being flat; and a second sliding portion protruded from said supporting portion, said second sliding portion having a first guiding zone, a landing zone, and a second guiding zone, each zone substantially being flat, and being separated in space from said first sliding portion;

wherein the first guiding zone, the landing zone, and the second guiding zone of each of said first and second sliding portions are arranged adjacently in order in a direction where the suspension arm rotates, and the first guiding zone and the second guiding zone are formed so as to be inclined downward in a direction of the landing zone; and wherein among boundaries which define the first guiding zone, the landing zone, and the second guiding zone of each of said first and second sliding portions, the boundaries formed in a direction intersecting with the direction in which the suspension arm rotates are formed parallel to a predetermined reference line;

the reference line is aligned with a direction in which the casting mold for molding the first and second sliding portions is pulled out; and among surfaces constituting said supporting portion, the surfaces which are molded by the casting mold are all molded so as not to disturb the pulling-out of the casting mold for molding the first and second sliding portions in the direction aligned with the reference line;

and further wherein said supporting portion is formed with material whose thermal expansion coefficient is low and wherein said first and second sliding portions are formed with material whose frictional coefficient is low.

4. The magnetic-disk storage device as set forth in claim 3, wherein said material whose thermal expansion coefficient is low, is either a polymer containing carbon fibers or a polyimide containing carbon fibers and wherein said material whose frictional coefficient is low is a polymer containing polytetrafluoroethylene (PTFE).

* * * * *